United States Patent [19]

Burkett

[11] Patent Number: 5,566,591

[45] Date of Patent: Oct. 22, 1996

[54] ENGINE/TRANSMISSION ADAPTER KIT

[76] Inventor: James D. Burkett, 3069 Carnelian St., Las Vegas, Nev. 89121

[21] Appl. No.: 237,284

[22] Filed: May 3, 1994

[51] Int. Cl.$^6$ .................................................. F16H 57/02
[52] U.S. Cl. ............................ 74/606 R; 403/3; 403/337
[58] Field of Search ............................ 74/606 R, 467, 74/606 A; 464/182; 403/3, 337, 287, 4

[56] References Cited

U.S. PATENT DOCUMENTS

| | | |
|---|---|---|
| 2,915,133 | 12/1959 | Kraus . |
| 2,982,150 | 5/1961 | Kolbe . |
| 3,122,029 | 2/1964 | Shook et al. ............................ 74/606 R |
| 3,194,335 | 7/1965 | Yue . |
| 3,550,713 | 12/1970 | Swanson .................................. 180/64 |
| 3,772,938 | 11/1973 | Johnson .................................. 74/606 R |
| 3,829,117 | 8/1974 | Park . |
| 3,902,333 | 9/1975 | Dossier ........................................ 64/14 |
| 4,065,219 | 12/1977 | Levine . |
| 4,086,012 | 4/1978 | Buckley et al. ...................... 403/337 X |
| 4,121,532 | 10/1978 | Coryell ................................... 403/337 X |
| 4,155,266 | 5/1979 | Bradley .................................. 74/606 R |
| 4,253,535 | 3/1981 | Kleine et al. . |
| 4,262,552 | 4/1981 | Honda . |
| 4,346,773 | 8/1982 | Hofbauer et al. . |
| 4,362,065 | 12/1982 | Baratti . |
| 4,369,559 | 1/1983 | Phillips . |
| 4,478,593 | 10/1984 | Brown .................................... 74/606 R |
| 4,479,568 | 10/1984 | Palazzolo et al. . |
| 4,641,547 | 2/1987 | Stich et al. ............................. 74/606 R |
| 4,745,986 | 5/1988 | Hanenberger . |
| 4,922,599 | 5/1990 | Durfee . |
| 5,163,335 | 11/1992 | Isom et al. . |
| 5,299,880 | 4/1994 | Bouchard ......................... 74/606 R X |
| 5,404,772 | 4/1995 | Jester ....................................... 74/467 X |

Primary Examiner—Vinh T. Luong
Attorney, Agent, or Firm—Quirk & Tratos

[57] ABSTRACT

An adapter kit for use in connecting an engine to a transmission is disclosed. In particular, the kit is useful in connecting a Harley-Davidson motorcycle engine to a Volkswagen automobile transmission. In general, the kit comprises a bell or second housing, a flywheel, and adapter elements securing the flywheel to an output shaft of the engine, along with assorted other assembly components. The bell housing is interposed between the output shaft side of the engine and the housing of the transmission. The adapter elements for securing the flywheel preferably comprise a flywheel adapter and gland nut which secure the flywheel in the proper position to the output shaft of the engine.

8 Claims, 6 Drawing Sheets

ENGINE/TRANSMISSION ADAPTER KIT

FIELD OF THE INVENTION

The present invention relates to a kit for connecting an engine and transmission. More specifically, the present invention relates to a adapter kit comprising a bell housing, flywheel, adapter means, preferably in the form of a gland nut and flywheel adapter, and related accessories, for connecting a motorcycle engine, preferably of a type marketed under the name Harley-Davidson to a automobile transmission preferably of a type marketed under the name Volkswagen.

BACKGROUND OF THE INVENTION

The popularity of dune buggies, or similar all-terrain vehicles has swelled in past years. These types of vehicles are typically four-wheeled, open frame vehicles powered by a small motor and having a conventional transmission.

Similarly, the popularity of "trikes," or three-wheeled open air vehicles, for leisure use has grown. These trikes are similar to their four-wheeled counterparts, except that they have three wheels, and are typically used for on-road applications.

In both cases, several engine and transmission combinations have been devised for use in powering these vehicles. By far, one of the most popular has been the use of the engine and transmission combinations manufactured and sold under the name Volkswagen or "VW" VW engines and transmissions, adopted from the popular VW "Bug" or "Beetle" cars, have several advantages. First, the extreme popularity of these automobiles has led to the great availability of original and replacement engines, transmissions, and related parts. Second, these engines are extremely reliable, rugged, and are fairly light-weight. Lastly, these engines are air-cooled, eliminating the need for costly and complicated liquid cooling systems.

The VW engines used in these sport vehicles are of a 4 cylinder variety, and range in size from 1300 to 1800 cc. The most common VW transmissions employed are the Type 1 Transaxles, a 4 speed transmission with reverse.

Lately, several alternatives to the use of the VW engine and transmission combination have been explored. One option is the substitution of a motorcycle engine manufactured by Harley-Davidson Co. for the VW automobile engine. In particular, the Harley-Davidson V-twin 80 C.I.D. engines manufactured from 1980 to the present have been deemed suitable for use in dune-buggies and "trikes."

These Harley-Davidson engines have the advantage that they are air-cooled, are light-weight, and offer higher horsepower-to-weight and torque-to-displacement ratios than stock VW automobile engines.

On the other hand, the transmissions used on the Harley-Davidson motorcycles are not suitable for use on dune-buggies or "trikes." Therefore, it has been found desirable to power the vehicle with a combination of a Harley-Davidson engine coupled to the VW transaxle. Unfortunately, before the present invention, no simple, reliable means has been devised for coupling these Harley-Davidson engines to the VW transaxles.

SUMMARY OF THE INVENTION

In order to overcome the above stated problems and limitations, a unique engine adapter kit is provided for coupling a Harley-Davidson manufactured engine to a VW manufactured transaxle. Accompanying this adapter kit is a unique method of mounting a Harley-Davidson engine to a VW transaxle.

In its preferred embodiment, the adapter kit comprises a bell housing, a flywheel, and means for attaching the flywheel to the output shaft of the engine. In the preferred form, the attaching means comprises a flywheel adapter and a gland nut.

The bell housing is a substantially ring-shaped body having a central aperture therethrough in which the rotor and output shaft of the engine are allowed to rotate. The bell housing is provided with a number of holes or bores for alignment with bores or holes in both the engine and transmission for use with attaching devices for securing the bell housing to the engine and transmission.

The flywheel is a primarily disc-shaped member having a central flange with a central hole therein, and a number of teeth on its outer periphery. Holes are also provided on one side of the flywheel for engagement of attaching means, whereby a pressure disc may be attached thereto.

The attaching means, as stated above, preferably comprise a gland nut and flywheel adapter. The gland nut is comprises a substantially hollow tubular body having a head at one end. At least a portion of the interior of the body of the nut is threaded for engagement with a threaded portion of the output shaft which extends from the engine.

The flywheel adapter is also a substantially tubular member, having an interior hollow section large enough to allow passage therethrough of the body portion of the gland nut. One end of the adapter includes an upwardly extending neck having a number of holes therein. When installed, the neck engages the flange on the flywheel, and the holes accept pins passing through holes in the flange in the flywheel. At the opposite or second end of the adapter, the interior portion thereof has a number of splines thereon for interengagement with splines located on the exterior of the output shaft near the rotor.

In accordance with the present invention, a method of connecting an engine to a transmission is provided. In the preferred method, the bell housing is first attached to the output side of the engine. This is preferably accomplished by passing the bell housing over the output shaft and bolting the housing to the engine.

The flywheel adapter is attached to the rear of the flywheel using a number of pins. After installation of a spacer next to a rotor portion of the output shaft, the adapter/flywheel assembly is advanced over the sprocket shaft until the splines on the shaft and in the adapter engage one another.

Next, the gland nut is inserted into the adapter through the central hole in the flange of the flywheel. The gland nut is threaded onto the end of the sprocket shaft until firmly engaged therewith.

A pressure plate in the transmission can then be bolted or otherwise connected to the flywheel, and then the housing of the transmission can be bolted to the side of the bell housing opposite the engine.

In the preferred form, the adapter kit provides several important functions. First, the bell housing thereof provides proper spacing between the engine and the housing of the transmission to allow for the length of the sprocket shaft and the flywheel. Second, the bell housing provides protection for the interior working components. Further, the attachment means, in the form of the flywheel adapter and gland nut, transmits the rotational energy of the sprocket shaft to the flywheel, and yet secures the flywheel to the shaft.

Further objects, features, and advantages of the present invention will become apparent from the detailed description of the drawings which follows, when considered with the attached figures.

DESCRIPTION OF THE DRAWINGS

FIG. 2b is a front view of the bell housing of FIG. 2a;

FIG. 3b is a rear view of the flywheel of FIG. 3a;

FIG. 4b is a front end view of the gland nut of FIG. 4a;

FIG. 5b is an rear view of the flywheel adapter of FIG. 5a.

DETAILED DESCRIPTION OF THE PREFERRED EMBODIMENT

Figure 1:
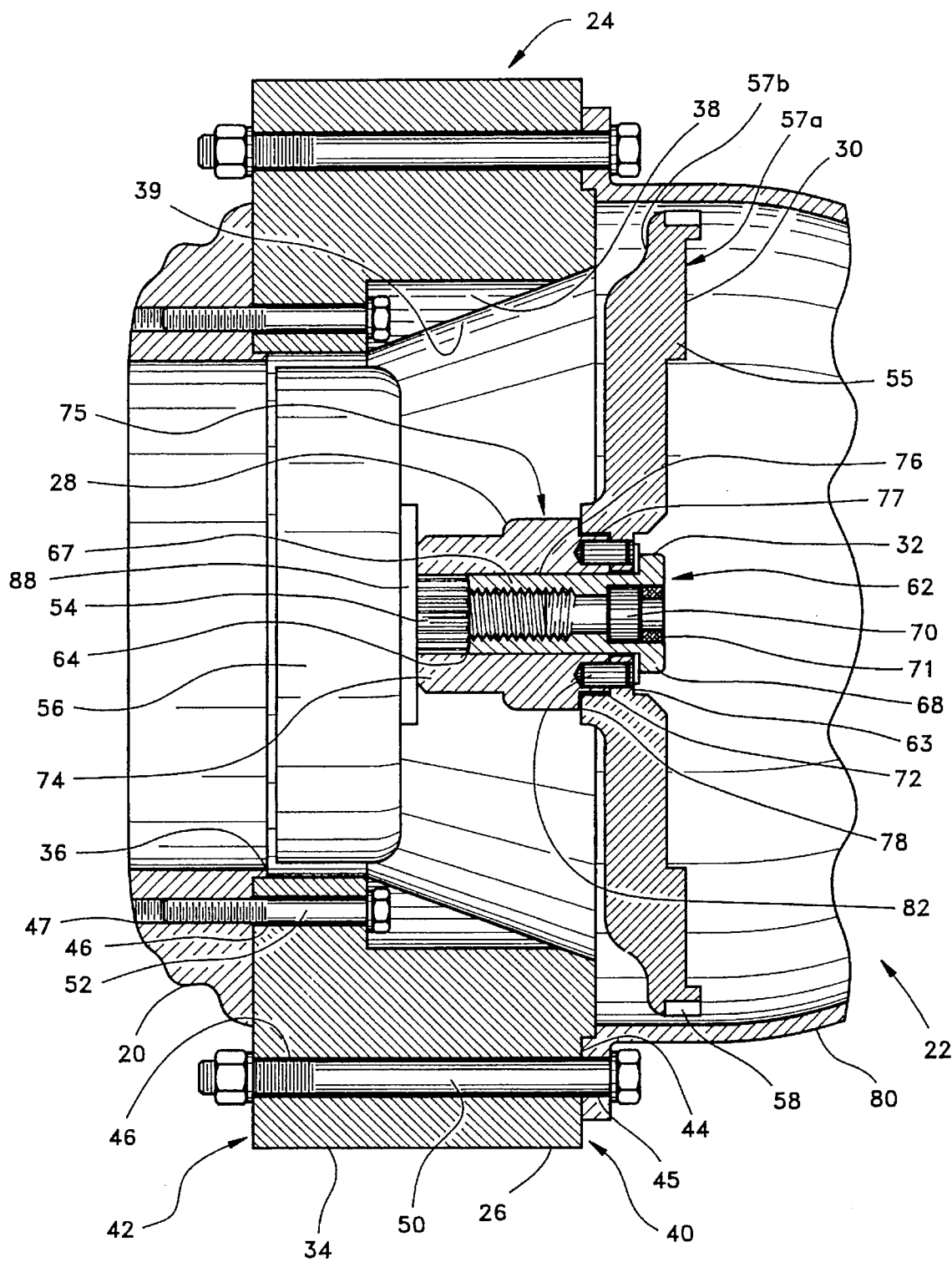
FIG. 1 is a cross-sectional side view of an adapter kit preferably comprising a bell housing, flywheel adapter, flywheel, gland nut, and associated parts, as used to connect a transmission to an engine.
Figure 2A:
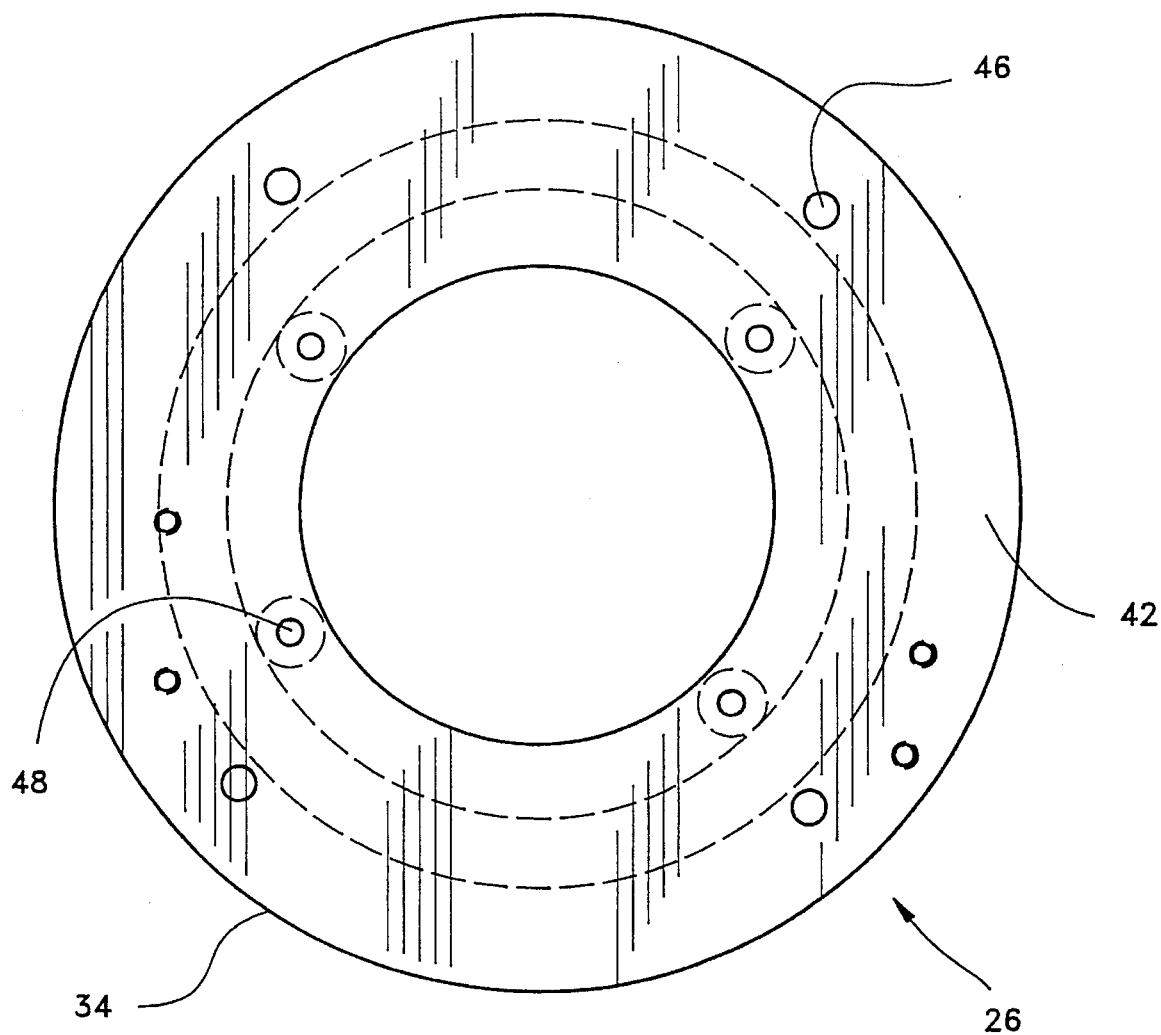
FIG. 2a is a rear view of the bell housing of the adapter kit of the present invention.
Figure 2B:
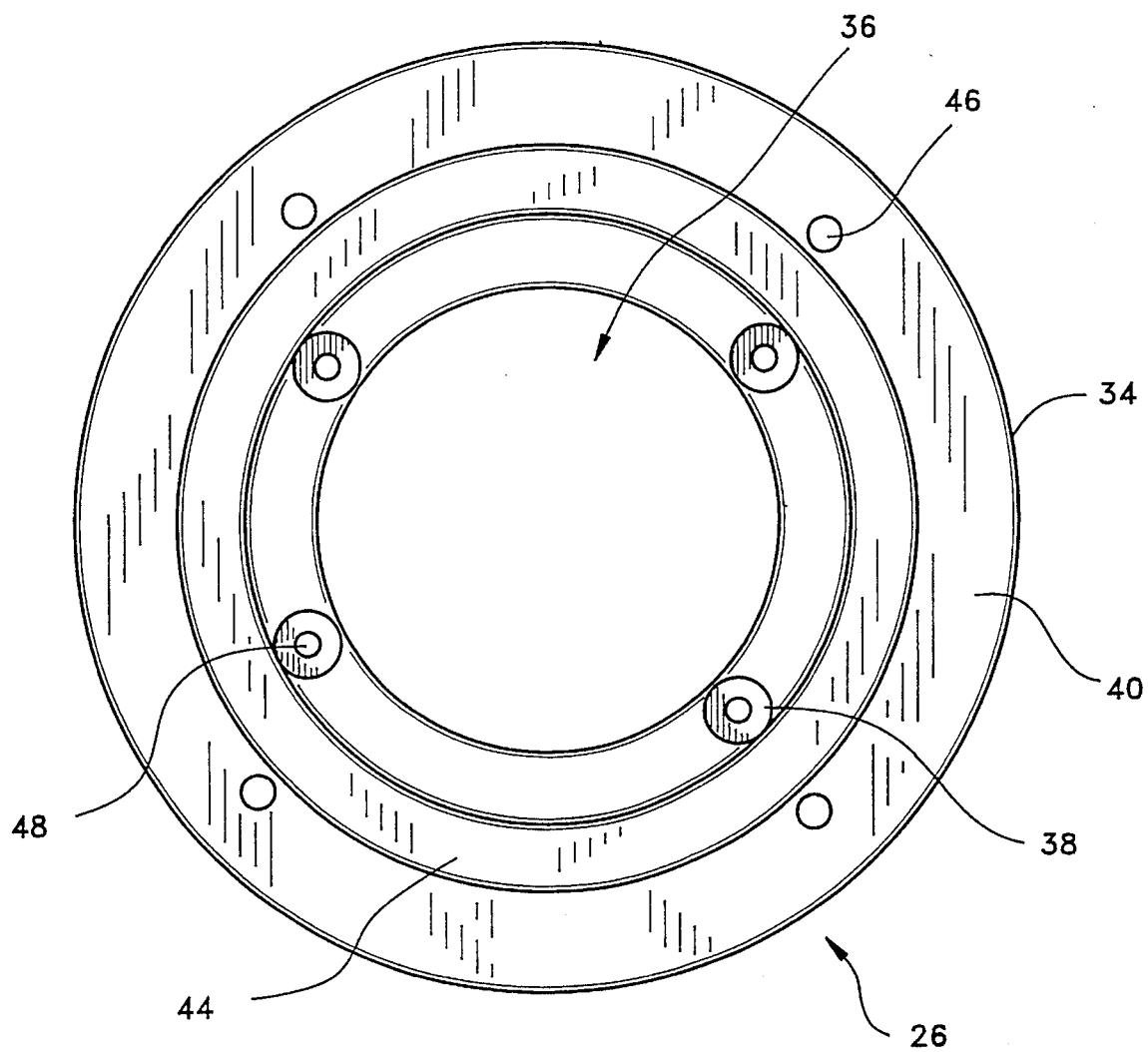
Figure 3A:
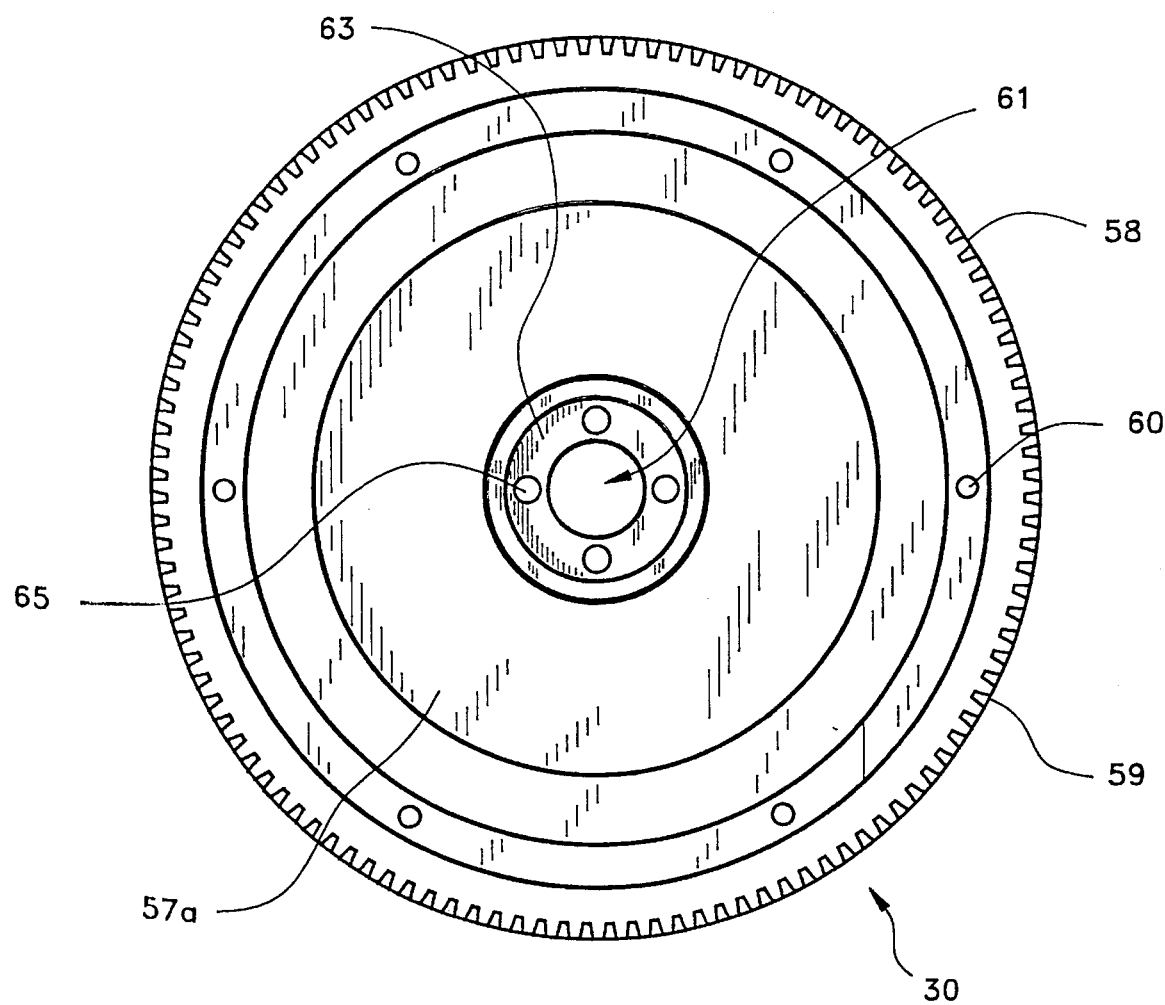
FIG. 3a is a front view of the modified flywheel of the adapter kit the present invention.
Figure 3B:
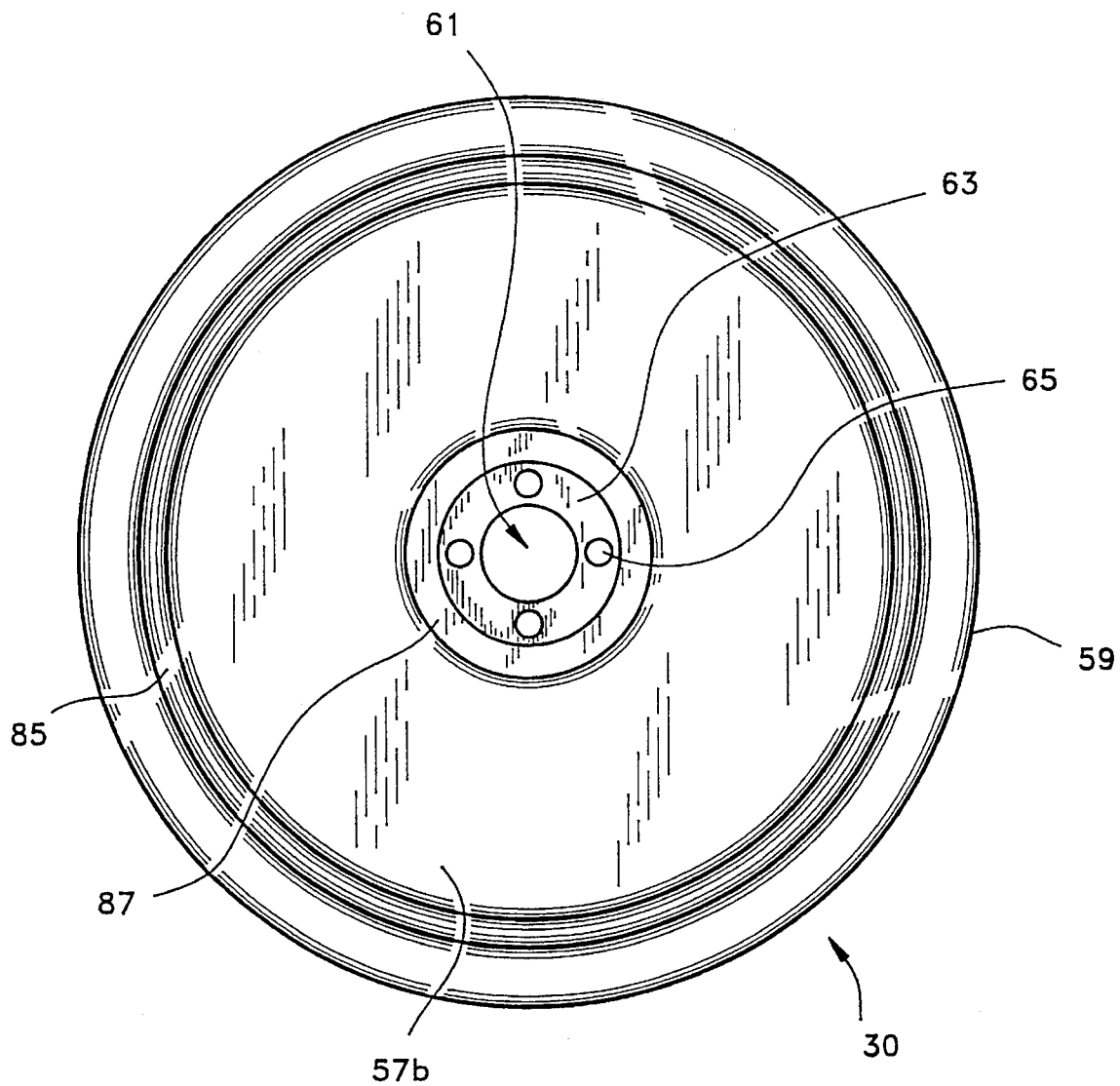
Figure 4A:
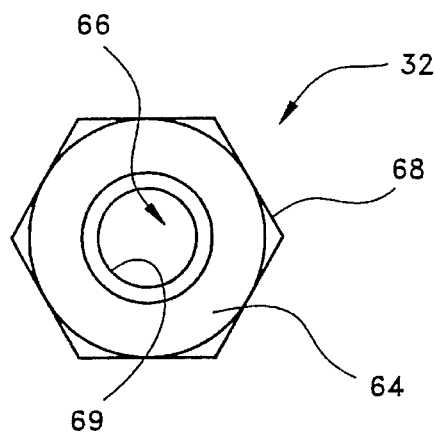
FIG. 4a is a rear end view of the gland nut of the adapter kit of the present invention.
Figure 4B:
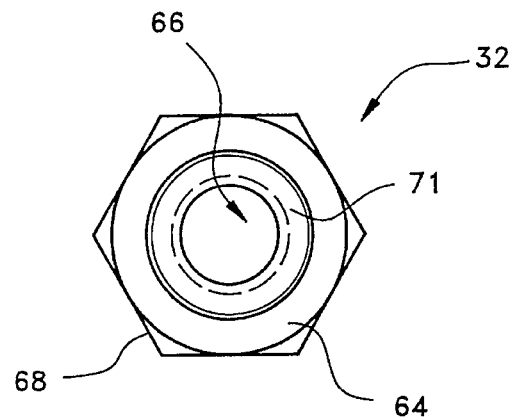

FIG. 1 illustrates an engine 20 connected to a transmission 22 using the adapter kit 24 of the present invention. The engine 20 is preferably a Harley-Davidson manufactured, V-twin, 80 c.i.d., engine of the type manufactured between 1980 and later, which has an output end or portion with an output shaft in the form of a standard sprocket shaft 54, which includes a free coupling end, extending from a rotor 56. The sprocket shaft 54 and rotor 56 are standard to the above-referenced model engines. The transmission 22 is preferably a Volkswagen Type I transaxle.

The adapter kit 24 generally preferably comprises a bell or second housing 26, flywheel 30, attachment means 41, preferably in the form of a flywheel adapter 28 and gland nut 32, and assorted fasteners, seals, and spacers, as will be described in more detail below.

The bell housing 26 is a substantially ring-shaped body having a first end 40 and a second end 42. The bell housing 26 has a primarily circular outer surface 34. In general, the bell housing 26 has an overall diameter of about 14", and a thickness from first end 40 to second end 42 of about 4½." A central aperture 36 or axial opening is located in the bell housing 26. The aperture 36 is, at a minimum, large enough in diameter to allow passage therethrough of the sprocket shaft 54, and to allow rotation therein of the rotor 56.

Most preferably, the diameter of the aperture 36 is larger at the first end 40 of the housing 26 than at the second end 42. In particular, it is desirable that the aperture 36 only have a diameter just great enough to allow rotation of the rotor 56 therein at the second end 42. Thus, at this end 42, the aperture 36 has a diameter of about 7". Preferably, however, at approximately the same distance along the housing 26 as the rotor 56 extends into the housing 26, the aperture 36 begins to widen. In fact, at the first end 40 of the housing 26, the aperture 36 has a diameter of about 9–. As can be seen, the transition from the smaller diameter portion of the aperture 36 to the wider portion creates a tapered section 39.

It is noted that it is possible for the aperture 36 to be of constant diameter throughout the housing 26, or even that the aperture 36 become of increasingly smaller diameter towards the first end 40 of the housing 26. This causes the housing 26 to have a greater overall mass, which is undesirable from both a weight and cost of materials standpoint.

An annular lip 44 is located on the first end 40 of the bell housing 26. This lip 44 is recessed into the first end 40 of the bell housing 26 by a distance of about ⅛." Further, the lip 44 is preferably about 1½ wide. As will be described in more detail later, the lip 44 is preferably flat, and otherwise sized, as described above, to allow mounting of the transmission 22 thereagainst.

Preferably, the bell housing 26 is machined from a block of fine grain aluminum, in either cast or billet form. In cast form, the bell housing 26 is made from 356 aircraft grade aluminum or better, with a hardness of T6 or better, with at least 30,000 psi tensile strength. In billet form, the bell housing 26 is made from 6061 aluminum or better, with a hardness of T6-511 or better.

Preferably, a first set of four mounting holes 46 pass through the bell housing 26 from the first end 40 to the second end 42. At the first end 40 of the bell housing 26, the holes 46 are located in the lip 44. These holes 46 are preferably located in a position such that when a housing 80 of the transmission 22 is placed against the first end 40 of the bell housing 26, as described in more detail below, the holes 46 line up with mounting holes 45 on the transmission 22. Further, the holes 46 are sized to allow passages therethrough of a bolt 50 having a diameter of at least 7/16".

A second set of holes 48 are located near the central aperture 36 in the bell housing 26, and pass from the first end 40 to the second end 44 of the bell housing 26. These holes 48 are preferably located such that when the engine 20 is abutted against the bell housing 26, bolts 52 may be passed through the holes 48 into engagement with holes 47 located in the engine 22. To this end, the holes 48 are also preferably sized to allow passage therethrough of bolt having a diameter of at least 5/16".

Most preferably, these holes 46 pass from the second end 42 of the housing 26 to counterbores or recesses 38 at their intersection with the first end 40 of the housing 26. In this fashion, the bolts 52 or other fasteners can engage a flat surface. It is noted that these bolts 52, and bolts 50, are preferably of Grade 8 or better, SAE J429, and are zinc-galvanize plated. Further, it is desirable to use appropriate washers when using these bolts, and where necessary appropriate nuts, as will be appreciated by one skilled in the art. As can be seen, if it were not for such recesses 38, the fasteners 52 would otherwise engage the tapered section 39 of the inside of the bell housing 26. Such engagement would not facilitate firm engagement of the fastener, however, with the bell housing 26.

The flywheel 30 is a primarily disc-shaped member comprising a main body portion 55 having a first side 57a, a second side 57b, and an outer perimeter 59. A bore 61 is centrally located in the flywheel 30. A flange 63 is located in the bore, and extends outwardly from the main body portion 55 of the flywheel 30. The flange 63 is preferably located about midway between the first and second sides 57a,b of the flywheel 30. The flywheel 30 preferably comprises a customized Volkswagen 200 mm flywheel.

In the preferred embodiment, the flywheel 30 has an overall diameter of about 10½", and is about 1" in thickness. As can be seen, however, while the flywheel 30 is primarily disc-shaped, there are several ridges and contours defining the main body portion 55. Such contours are well known in the art, and exist primarily to allow the attachment thereto of a transmission pressure plate (not shown), and to provide smooth rotation of the flywheel 30. Several of the contours exist on the second side 57b of the flywheel 30, such as contour 85 and ledge 87. As described in more detail later, the ledge 87 is designed for abutment against a portion of the flywheel adapter 28.

A number of teeth 58 are located at the outer perimeter 59. A number of bores 60, preferably six, are located in the flywheel 30 near the outer perimeter. Each of the bores 60, which are located equidistant about the flywheel 30, is preferably passes from the first side 57a towards, but not completely through, the second side 57b of the flywheel. These bores 60 are sized and spaced to allow the attachment thereto onto the first side 57a of the pressure plate (not shown), as is standard in the type of transmission 22 described above.

A number of holes 65 are also located in the flange 63. These holes 65 are sized to permit passage therethrough of a key or pin 82, as will be described in more detail later.

Attaching means 41 are provided for connecting the flywheel 30 to the sprocket shaft 54 of the engine 20. In the preferred embodiment, the attaching means 41 comprises a flywheel adapter 28 and a central locking gland nut 32, along with a number of keys 82. It is to be understood, however, that while the attaching means 41 preferably comprises the nut 32 and adapter 28 as described in detail below, it is believed possible to have one of many variations of attaching means 41 for connecting the flywheel 30 to the shaft 54.

The gland nut 32 is a tube-like member comprising a main body portion 67 and a head 68. The head 68 is located at a first end 62 of the nut 32, and the body 67 extends from the head 68 towards a second end 64. Preferably, the gland nut 32 is a modified sprocket compensator nut manufactured by the Harley-Davidson.

The main body portion 67 is preferably circular in cross-section, and has an outer diameter of about 1." The body 67 is hollow, having a central passage 66 therethrough. The interior of the gland nut 32 has a number of threads 69, preferably running at least some distance from the second end 64 thereof towards the head 68. The threads 69 are sized to engage threads located on the outside surface of the sprocket shaft 54.

The head 68 extends outwardly from the body of the nut 32. In particular, the head 68 preferably has a hexagonal shape with a 1.5" size, to allow manipulation by a similar sized wrench.

The total length of the nut 32 is about 2.5. " The nut 32 is preferably made of stainless steel or similar material.

In its preferred form, the glandnut 32 includes a pilot bearing 70 located in the central passage 66 thereof, near the first end 62. The bearing 70, and an accompanying seal 71 are preferably press-fit into the unthreaded portion of the central passage 66. As can be seen, the bearing 70 is preferably ring-shaped, having a central hollow portion. The seal 71 is also preferably ring-shaped and is located in the head 68 portion of the nut 32.

The flywheel adapter 28 is also a substantially tubular shaped member, and preferably comprising a body 75 and a short neck 77 extending therefrom. The neck 77 is located at a first end 72 of the adapter 28, and the body 75 extends from the neck 77 to a second end 74 of the adapter 28. A central passage 76 is located through the entire adapter.

The central passage 76 is sized to allow the adapter 28 to fit over the gland nut 32 and over a splined portion of the sprocket shaft 54. In particular, therefore, a short portion of the passage 76 near the second end 74 has a number of splines 79 thereon for interlocking with splines located on the output sprocket shaft 54 from the engine 20. The remainder of the passage 76 is preferably smooth in order to permit passage therethrough of the gland nut 32.

As can be seen, the body 75 of the flywheel adapter 28 is preferably circular outer dimension, and is somewhat thick. The second end 74 of the adapter 28, and thus the body 75 at this location, is preferably flat, so as to provide a smooth face for abutment against a spacer 88, as will be described later.

The neck 77 is preferably tubular extension extending at the first end 72 of the adapter 28 from the body 75. The neck 77 extends outwardly about 0.4," and the reduced diameter of the neck 77 as compared to the body 75 creates a flange 78. As will be described in more detail later, this flange 78 is preferably flat and allows intersection with the flywheel 30.

Figure 5A:
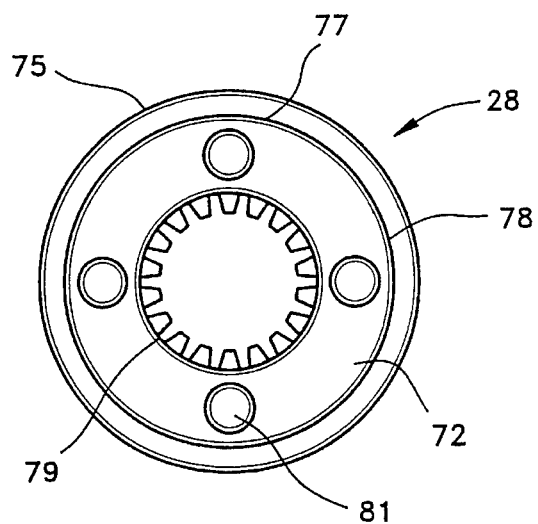
FIG. 5a is a front view of the flywheel adapter of the adapter kit of the present invention.
Figure 5B:
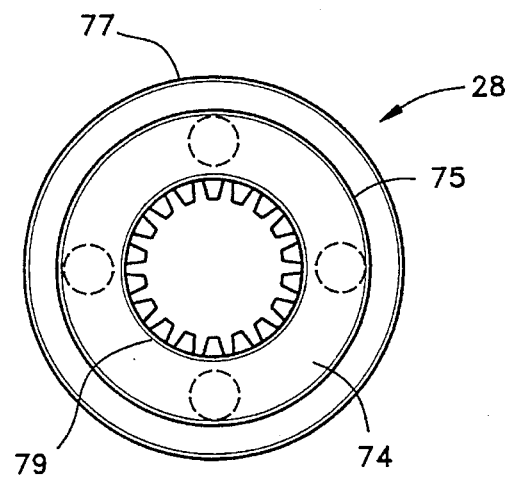

A number of holes 81 are located in the neck 77, as illustrated in FIG. 5a. These holes 81 preferably extend into the adapter 28 some distance, and are preferably uniformly spaced about the neck 77. The spacing and location of the holes 81 preferably allows the holes 81 to be aligned with the holes 65 in the flange 63 of the flywheel 30.

The adapter 28 may be made as a single piece of material, such as by casting it from iron or stainless steel. Alternatively, the adapter 28 may comprise a shortened standard Harley-Davidson shaft extension, welded to a spline coupler, with a pin carrier welded or attached to the extension to form the neck.

The use of the kit 24 in connecting the engine 20 to the transmission 22, and the function of each part thereof, will now be described in conjunction with FIG. 1. As can be seen, the bell housing 26 acts as a spacer between the housing 80 of the transmission 22, and the engine 20. In particular, because of the extension of the sprocket shaft 54 from the engine 20, the bell housing 26 provides proper spacing between the engine 20 and transmission 22 to provide proper placement of the flywheel 30 in the transmission housing 80. Further, the bell housing 26 protects the components therein.

In order to install the bell housing, the second end 42 of the bell housing 26 is first connected to the engine 20. This is preferably accomplished by sliding the bell housing 26 over the sprocket shaft 54 and rotor 56 until the second end 42 of the bell housing 26 contacts the engine 26. The bolts 52 are then passed through the mounting holes 46 in the bell housing and threaded into engagement with threads in the holes 47 in the engine 20. When connected, the bell housing 26 surrounds the sprocket shaft 54 and rotor 56 of the engine 22.

Next, the flywheel adapter 28 is connected to the flywheel 30. This is preferably accomplished by tapping the neck 77 located at the first end 72 of the adapter 28 into the central bore 61 on the second side 57b of the flywheel 30. The adapter 28 is tapped into this position until the flange 78 of the adapter 28 firmly contacts the ledge 87 on the flywheel 30. At that time, pins 82 are passed through the holes 65 in the flange 63 and into the holes 81 in the neck 77 of the adapter. The pins 82 securely engage the flywheel 30 to the adapter 28.

Next, a spacer 88 is preferably placed on the end of the sprocket shaft 54. The spacer 88 is a preferably ring-shaped member, similar to a washer. Preferably, the spacer 88 is a standard Harley-Davidson manufactured spacer washer. The spacer 88 is used to separate the adapter 28, which, when the kit 24 is assembled is located on the sprocket shaft 54 from the rotor 56. The spacer 88 may be installed merely by placing it over the sprocket shaft 54 and up against the rotor 56.

Once the spacer 88 is in place, the flywheel 30 and connected adapter 28 are then placed over the sprocket shaft 54. As can be seen, the adapter 28 is slid over the sprocket shaft 54 until the second end 74 of the adapter 28 engages the spacer 88. Manipulation of the adapter 28 is required in order that the splines 79 located on the interior surface thereof engage the splines located on the sprocket shaft 54.

Next, the gland nut 32 is placed into the central passage 76 within the adapter 28. This is accomplished by passing, second end 64 in first, the body portion 67 of the nut 32 through the hole 61 in the flywheel 30 and through the central passage 76 of the adapter. Once inserted, the second end 64 of the gland nut 32 is threaded onto the threaded end of the sprocket shaft 54, until the head 68 of the nut 32 firmly engages the first side 57a of the flywheel 30.

As can be seen, the engagement of the splines 79 in the adapter 28 and the splines on the sprocket shaft 54 cause the adapter 28 to rotate with the sprocket shaft 54. This rotational energy is transmitted to the flywheel 30 via the pinned connection at the neck 77 of the adapter 28 and flange 63 of the flywheel 30. The flywheel 30 is prevented from movement away from the adapter 28 by the gland nut 32, as the head 68 thereof surrounds the flange 63 on the side 57a opposite the adapter 28.

Next, the pressure plate (not shown and preferably of standard Volkswagen manufacture) of the transmission 22 is attached to the flywheel 30, as is known to one skilled in the art. This is accomplished by passing bolts or similar items through the use of the holes 60 in the flywheel 30.

After the clutch members and flywheel 30 are attached, the housing 80 of the transmission 22 is attached to the bell housing 26. Preferably, this is accomplished by aligning the housing 80 with the lip 44 on the bell housing 26. Then, the housing 80 is manipulated until the holes 45 therein align with the holes 46 in the bell housing 26. The bolts 50 are then passed through the aligned holes 45, 46. In the form described, because neither of the holes 45, 46 are threaded, use of a nut or means are necessary to secure the bolt 50 in place.

Other related devices may be added to the kit 24 in order to make installation and assembly of the engine 20 and transmission 22 to a vehicle more simple and complete.

It will be understood that the above described arrangements of apparatus and the method therefrom are merely illustrative of applications of the principles of this invention and many other embodiments and modifications may be made without departing from the spirit and scope of the invention as defined in the claims.

I claim:

1. A kit for use in connecting an engine to a transmission, said engine having a housing with an output end with an output shaft extending therefrom and having splines thereon over a first section and being threaded on an exterior or a second section and said transmission having a transmission housing, comprising:

a connector housing having a first end, a second end, and a central aperture therethrough, said first end of said connector housing adapted for connection to the housing of said engine at said output end, said second end of said connector housing adapted for connection to the transmission housing whereby said connector housing spaces said output end of said engine apart from said transmission housing;

a flywheel adapter comprising a substantially tubular member having a first end with neck extending therefrom, and a second end having a number of engaging splines located therein for engagement with said splines on said engine output shaft;

a flywheel for mounting to said flywheel adapter, said flywheel having a central flange with a bore therethrough and including a number of engaging teeth on an outer periphery thereof; and a gland nut, said gland nut comprising a hollow cylindrical member having a head at one end and including threaded on an interior surface thereof for engagement with said threads on said engine output shaft, said gland nut sized for insertion into said flywheel adapter.

2. The kit of claim 1, further including pins for connecting said flywheel to said flywheel adapter.

3. The kit of claim 1, wherein said gland nut has a first interior portion with a first diameter and a second interior portion with a second diameter, said second diameter being larger than said first diameter.

4. The kit of claim 3, further including a pilot bearing located in said interior portion of said gland nut.

5. The kit of claim 1, wherein said aperture in said connector housing has a substantially circular shape at said first end and a substantially circular shape at said second end, said aperture being of a larger size at said second end than said first end.

6. The kit of claim 1, further including a spacer for location on the output shaft.

7. The kit of claim 1, wherein said aperture in said connector housing has a greater dimension at said second end than at said first end.

8. The kit of claim 1, wherein said connector housing includes a number of bores therein for use in connecting said connector housing to said engine and said transmission.

* * * * *